(12) United States Patent
Schaefer-Siebert

(10) Patent No.: US 6,748,916 B2
(45) Date of Patent: Jun. 15, 2004

(54) METHOD FOR MOMENT-NEUTRAL SWITCHING OFF A CYLINDER BY DEACTIVATION OF GAS-CHANGING VALVES

(75) Inventor: Dietrich Schaefer-Siebert, Korntal-Muenchingen (DE)

(73) Assignee: Robert Bosch GmbH, Stuttgart (DE)

( * ) Notice: Subject to any disclaimer, the term of this patent is extended or adjusted under 35 U.S.C. 154(b) by 36 days.

(21) Appl. No.: 10/253,290

(22) Filed: Sep. 24, 2002

(65) Prior Publication Data

US 2003/0062019 A1 Apr. 3, 2003

(30) Foreign Application Priority Data

Sep. 29, 2001 (DE) ............................. 101 48 347

(51) Int. Cl.[7] .................................................. F02B 77/00
(52) U.S. Cl. .................................................. 123/198 F
(58) Field of Search ...................................... 123/198 F

(56) References Cited

U.S. PATENT DOCUMENTS

| | | |
|---|---|---|
| 5,267,541 A | 12/1993 | Taguchi et al. |
| 5,787,855 A | 8/1998 | Mueller et al. |

FOREIGN PATENT DOCUMENTS

| | | |
|---|---|---|
| DE | 195 01 386 A1 | 8/1996 |
| DE | 196 04 737 A1 | 8/1997 |
| DE | 196 28 024 A1 | 1/1998 |
| EP | 0 037 269 A1 | 10/1981 |

OTHER PUBLICATIONS

Patent Abstract of Japan vol. 015, No. 085 (M–1087), Feb. 27, 1991 & JP 02305307 A, Dec. 18, 1990.

Hartig et al: "Die BMW Zylinderabschaltung" ATZ Automobiltechnische Zeitschrift, Franckh'sche Verlagshandlung, Stuttgart, DE, BD. 2, NR. 83, Feb. 1, 1981, pp. 69–73.

*Primary Examiner*—Noah Kamen
(74) *Attorney, Agent, or Firm*—Michael J. Striker

(57) ABSTRACT

A method for changing between full engine operation and partial engine operation of a multi-cylinder combustion engine includes the step of activating at least the intake valve or the escape valve of a cylinder or a group of cylinders in full engine operation and deactivating the intake valve or escape valve or a cylinder or group of cylinders in partial engine operation. In a first step, a throttling of power of the cylinder to be deactivated takes place, and simultaneously, an increase of power of the other cylinders takes place, such that the entire moment produced by the engine follows a predetermined ideal engine moment. In a second step, a switching-off of the throttle cylinder takes place by means of the actuatable intake or escape valve. This method avoids undesired changes of the total moment of rotational produced by the engine. The invention is also directed at a device for performing the method.

7 Claims, 3 Drawing Sheets

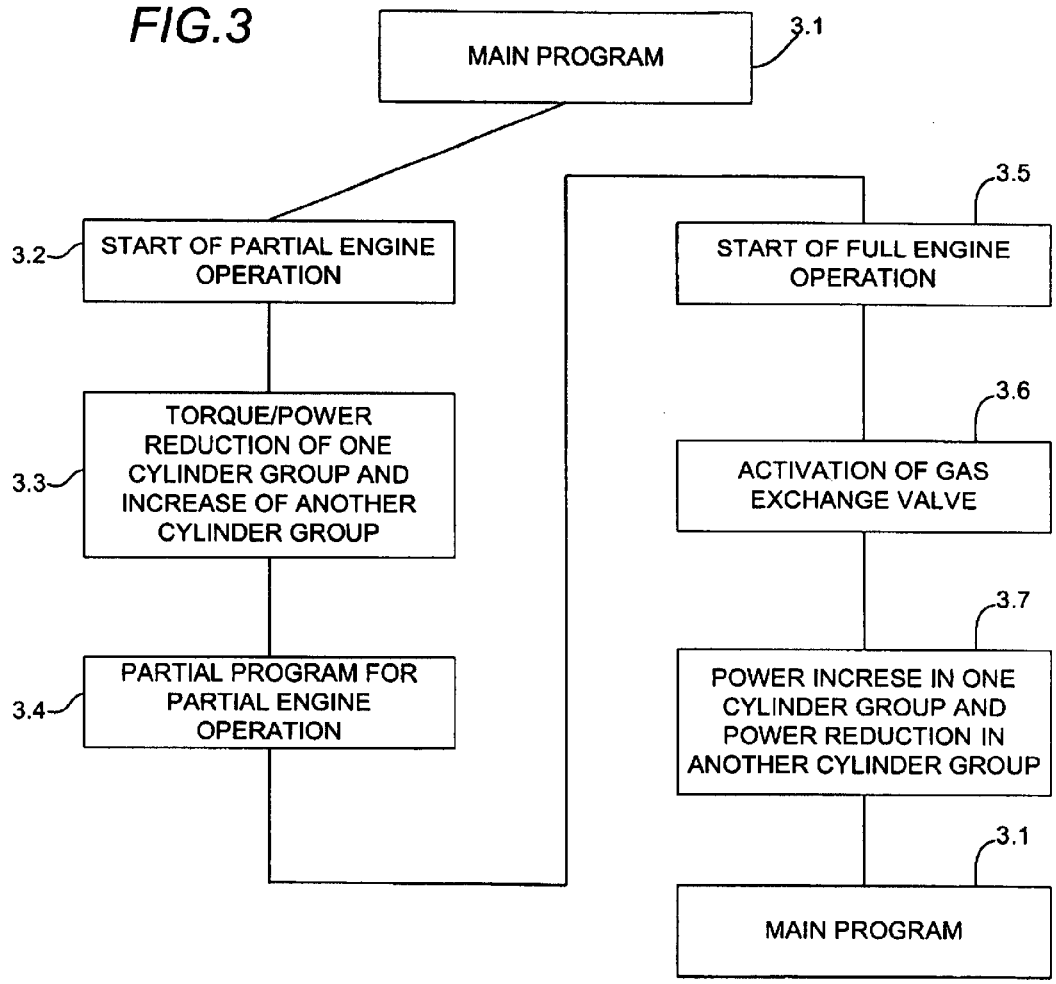

FIG.4.2
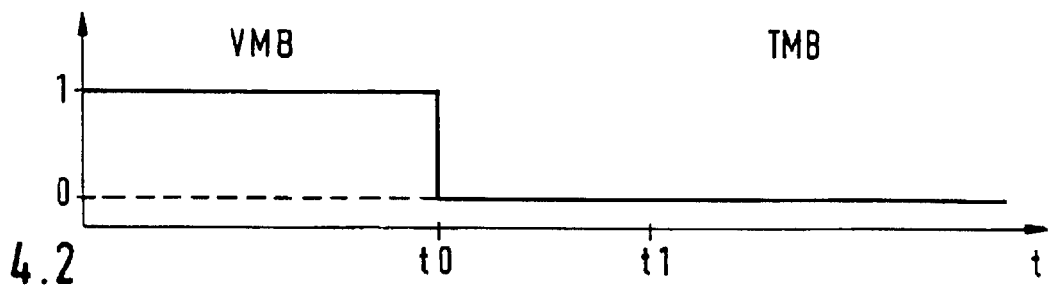
FIG.4.1
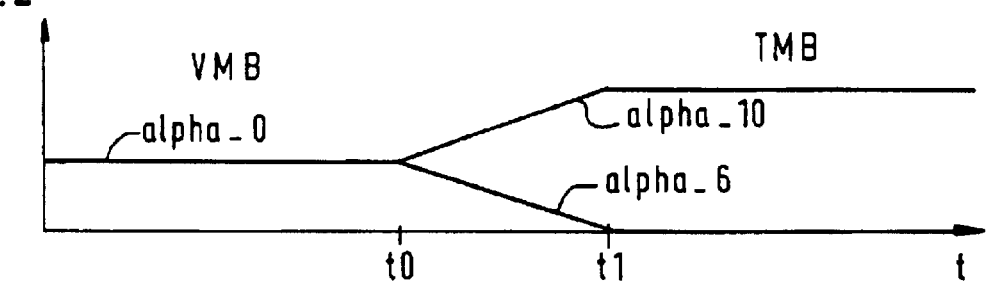
FIG.5
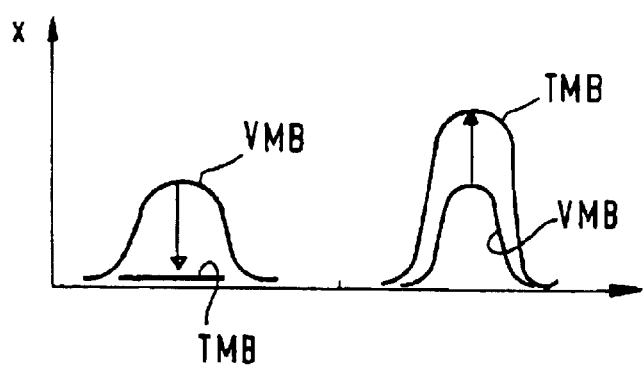

METHOD FOR MOMENT-NEUTRAL SWITCHING OFF A CYLINDER BY DEACTIVATION OF GAS-CHANGING VALVES

BACKGROUND OF THE INVENTION

The present invention relates to the actuation and de-actuation of cylinders of an internal combustion engine by deactivation and activation of the gas-changing valve of the respective cylinder.

U.S. Pat. No. 5,787,855 discloses a switching off of cylinder groups of an internal combustion engine by deactivation of the gas-changing valve. With motors with many cylinders, a driving situation exists in which the required power can be provided from a part of the cylinder. The switching off of one or more cylinders leads to the situation that the remaining operating cylinders are operated with an increased power and better efficiency. EP 37269 likewise shows a switching off of gas-changing valves. A continuous production of the valve stroke is known from DE 195 01 386.

The deactivation and activation of cylinders should be as undetectable as possible for the driver. In particular, no irregular moment of rotation change should occur upon changing between complete engine operation in which all cylinders operate and partial engine operation, in which at least one cylinder is switched off.

SUMMARY OF THE INVENTION

The present invention is based on the problem of realizing the most simple, undetectable switching on and off of cylinders as possible for the driver.

According to the present invention, the change between full engine operation and partial engine operation of a multi-cylinder internal combustion engine, in which at least the intake valve or the escape valve of a cylinder or a group of cylinders in full engine operation are activated and in partial engine operation, are deactivated. In a first step, a throttling of the power of the cylinder to be deactivated takes place and simultaneously, an increased of the power of the other cylinders takes place, so that the total moment provided from the engine follows a provided desired engine moment. In a second step, a switching off of the throttled cylinder takes place via the actuatable intake or escape valve of this cylinder.

For reactivation of the switched-off cylinder, that is, for changing from partial engine operation to full engine operation, a switching-on of the throttled cylinder takes place in a first step via the actuatable intake or escape valve and in a second step, an unthrottling of the power of the cylinder to be reactivate takes place, along with a simultaneous reduction of the power of the other cylinders, so that the total moment provided from the engine follows a provided ideal engine moment.

With the above-described process, the advantage is provided that the change between partial and full engine operation does not occur through a sudden, abrupt and detectable actuation. In addition, the shift of the moment of rotation preparation from all cylinders on a part of the cylinder is at least approximately uniform and substantially temporal.

In this manner, particular advantages with variable valve controls with high temporal tolerances in switching-off operation is provided, which will be described below.

The change between partial and full engine operation and from full- to partial engine operation is accomplished through a control command. Between the time point of the change by means of the control command and the time point to which the changing is effective, a known time interval elapses, which is dependent on the constructive qualities of the valve control. A high tolerance or measure of deviation of this time interval has the result that between the change of the rotational moment from the other cylinders and the effective change between both types of engine operation, a time difference can occur, so that the changing over is detectable in an unwanted manner by the driver. Systems, for example, in which a variable valve stroke is determined by means of the relative positions of an opening cam shaft and a closing cam shaft, which are connected by means of a mechanical coupling gear, can have such temporal tolerances. A system with opening and closing cam shafts is described in the previously noted DE 195 01 386. The temporal range and uniformity of the shift between the cylinders provides, therefore, that also with temporal differences between the reduction of the moment of rotation of the cylinder to be switched off and the increase of the moment of rotation of the cylinders to be further operated, the entire moment of rotation change of a cylinder group is never suddenly operative.

One form of the invention contemplates that an internal combustion engine includes a respective throttle valve or flap for the cylinder to be switched off as well as the cylinders to be further operated, or an individual throttle valve. In this embodiment example, the throttle of the power of the cylinder to be deactivated takes place via a closing of the associated first throttle device and the increase of the power of the cylinders to be further operated takes place via an opening of the throttle device of the associated cylinders to be further operated.

To re-actuate the switched-off cylinder, an un-throttling of the cylinder to be reactivated takes place by means of an opening of the first throttle device and a reduction of the power of the remaining cylinders via a reduced opening of the throttle device of the remaining cylinders.

This provides the advantage that the invention can be used also with valve operations, whose opening stroke can be determined only digitally between zero and completely open.

A further form of the invention relates to an internal combustion engine with uniform or at least finely-staged adjustable stroke of the intake valve. Here, the throttling of the power of the cylinder to be deactivated takes place via a reduction of the lift of its intake valve, and the increase of the power of the cylinder to be further operated takes place via an enlargement of the lift of its intake valve.

For reactivating the deactivated cylinder, an un-throttling of this cylinder takes place via an increase of the stroke of the intake place to be reactivated and a reduction of the power of the remaining cylinders takes place via a reduction of the stroke of the intake valve of the remaining cylinders.

Therefore, a further, separate throttle device is insurable, as is required in the subject matter of the other embodiment described above.

Further advantages are provided with engines with a control apparatus for switching off of the cylinders and the re-operating of the cylinders: these types of control apparatus are typically connected with a bus system. The information is exchanged via the bus system non-synchronously with the calculating program of the individual control apparatus, which runs synchronously with the movement of the crank shaft of the engine. With a digital switching off of the cylinder groups, a time slowing of the digital increase of the power of the other cylinder groups can take place, which the driver detects as a jolt or jerk.

With the invention, in contrast, a digital switching does not take place, rather, a uniform transition. Because of the uniformity of the transition, no jolt or jerk occurs, when a control apparatus begins this uniform transition somewhat earlier than the other control apparatus of the counter-running transition.

In conclusion, the invention affects an optimization of the uniformity of the moment of rotation upon changing between full and partial engine operation with minimal demands on the constructive complication of the switching-off of the valve.

The invention is directed also at an electronic control device for performing at least one of the above-described methods or one of the above embodiments.

BRIEF DESCRIPTION OF THE DRAWINGS

FIG. 3 shows a flow diagram as an example of an embodiment of the inventive method for changing between full engine operation and partial engine operation of a multi-cylinder combustion engine;

FIGS. 4.1 and 4.2 show the actuation of the throttles and cylinder change over time.

FIG. 5 shows how the valve lift curve of the remaining cylinders is increased such that again the entire moment of rotation provided by the engine is not changed upon transition from full engine operation into partial engine operation.

DETAILED DESCRIPTION OF THE PREFERRED EMBODIMENTS

Figure 1:
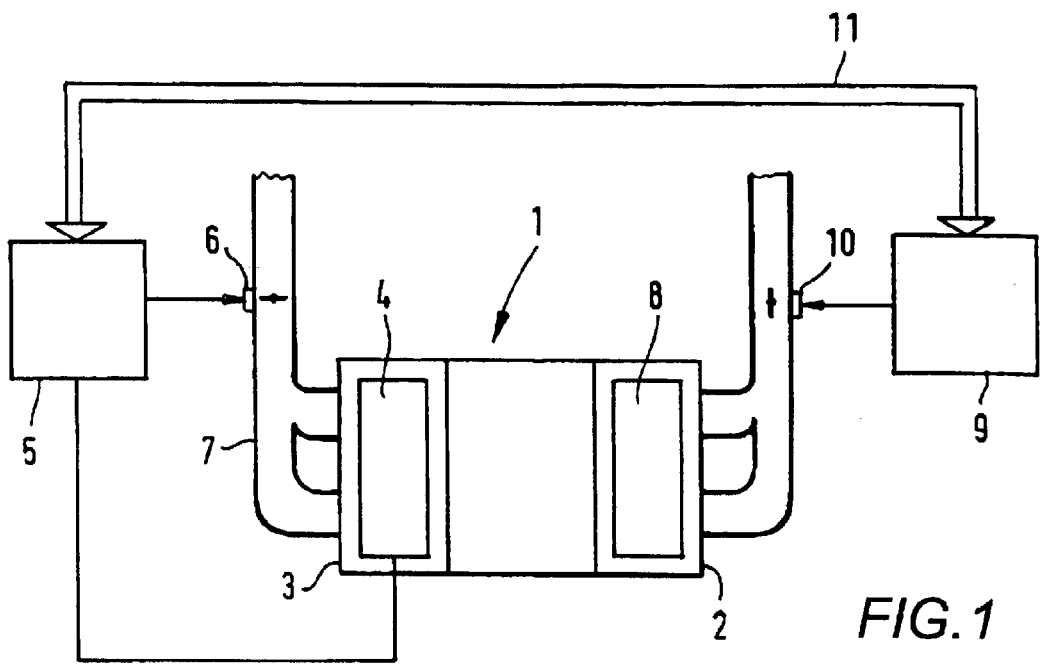
FIG. 1 shows the technical environment of one embodiment of the present invention.

In FIG. 1, reference numeral 1 designates an internal combustion engine with a right roller beam 2 and a left roller beam 3. The left roller beam connects activatable and deactivatable gas-changing valves via a gas-changing control 4. The activation state of the gas-changing valves is determined from a control apparatus 5. The control apparatus 5 further determines the opening angle alpha__6 of a throttle valve or flap 6 in a left vacuum pipe 7. The right roller beam analogously connected via a gas-changing control 8, which in the illustrated example is not deactivatable, and via a control apparatus 9, which regulates the opening angle alpha__10 of the throttle flap 10 in the right vacuum pipe. In the illustrated position of the throttle flap, the cylinders of the left roller beam 3 are deactivated. The throttle flap of the left roller beam therefore is closed, and the throttle flap of the right beam is opened, as in normal conditions. The control apparatus are connected via a bus system 11 in the illustrated example.

Instead of these two control apparatus connected via a bus system, also a single control apparatus can regulated the activation state of the gas-changing valve and the degree of opening of the throttle flap. The control apparatus assume a further function, such as the processing of input signals via operating parameters of the internal combustion engine and the regulation of further quantities, in particular, of the fuel volume and the ignition.

Figure 2:
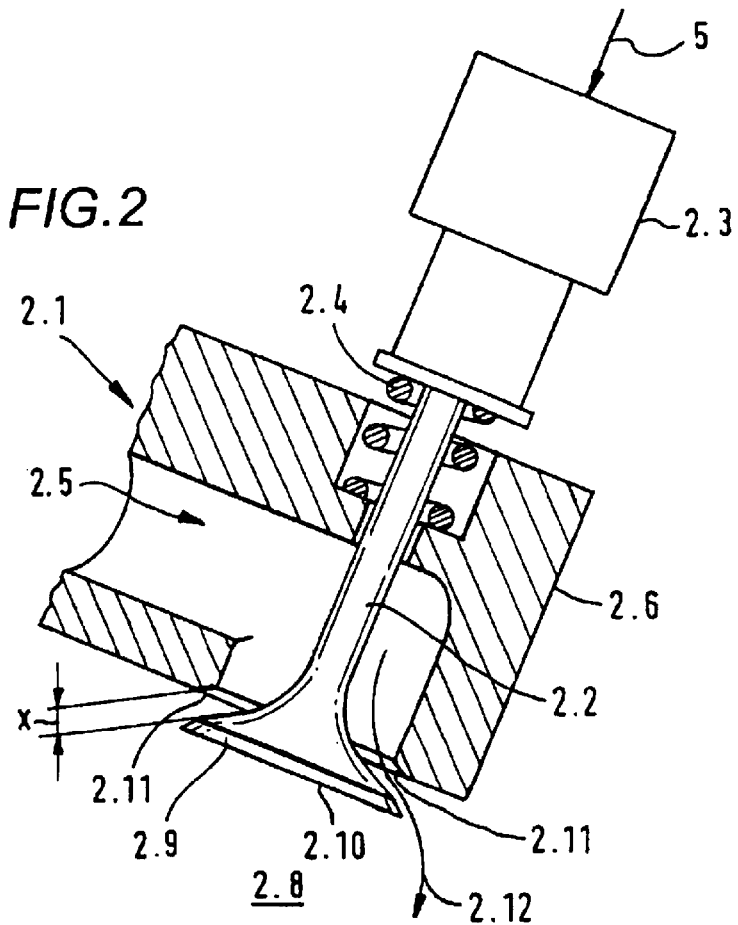
FIG. 2 shows a gas-changing valve plate 2.1 as an essential component of the deactivatable gas-changing control 4 with a gas-changing valve 2.2, an operating device 2.3, and a valve spring 2.4.

FIG. 2 shows a gas-changing valve plate 2.1 as an essential component of the deactivatable gas-changing control 4 with a gas-changing valve 2.2, an operating device 2.3, and a valve spring 2.4. The numeral 2.6 represents a cylinder head with a gas channel 2.5 the connection of the gas channel to the combustion chamber 2.8 of a cylinder is opened or closed by the valve 2.2.

In the closed state, the sealing surface 2.9 of the valve plate 2.10 rests spring loaded on the valve seat 2.11 of the cylinder head 2.6. The connection is opened by lifting up of the valve plate 2.11 at a valve stroke x by operating of the valve 2.2 against the spring force by means of the operating device 2.3.

The operating device, for example, can include an electrically controlled hydraulic or mechanism. It is essential in connection with the invention that the cylinder can be deactivated by means of an effect of the operating device by a deactivation of the gas-changing valve.

FIG. 3 shows a flow diagram as an example of an embodiment of the inventive method for changing between full engine operation and partial engine operation of a multi-cylinder combustion engine. Block 3.1 represents a main program for engine control, in which injection times, ignition time points, and so on, are calculated and issued. Subsequently thereto, first the engine is operated in full engine operation with all cylinders. In the frame of the main program, the partial engine operation is initiated under predetermined conditions. These predetermined conditions, for example, can correspond with determined partial regions of the load number/rotational number spectrum. These partial regions show particularly that the supplied moment of rotation from the control apparatus in consideration of the driver's wishes already can be run from a partial volume of the cylinder. If a requirement for the partial engine operation exists in the control apparatus, the main program branches off to step 3.2, which represents the start of the partial engine operation issuing from the full engine operation. Subsequently, in step 3.3, first a reduction of the moment of rotation made ready from cylinder group 1 takes place, and a counter-running increase of the moment of rotation, or the power, from cylinder group 2 takes place.

The cylinder group 1 designates here the group of the cylinders to be deactivated, and the cylinder group 2 represents here the group of the cylinders to be further operated. When the end value of the designed reduction, or increase, of the moment of rotation/power of the different cylinder groups are achieved from the actual values, the valves of the cylinder group 1 are deactivated.

Subsequently, a further operation of the engine with a partial program for the partial engine operation takes place, represented by step 3.4. If a demand for full engine operation exists in the control apparatus, for example, by means of the driver's wish for an increased moment of rotation, the program branches off to step 3.5, which represents the start of the full engine operation.

Subsequently, in step 3.6, an activation of the gas-changing valve of the cylinder group 1.1 takes place (that is, the previously deactivated cylinder). An increase of the power of cylinder group 1 in step 3.7 and an opposite reduction of the power of cylinder group 2 are linked up. The manner of procedure of step 3.7 means that the moment existing before the wish for increased moment from cylinder group 2 is separated first again on the cylinder groups 1 and 2, before, then, by means of an increase of the power/moment of rotation of both cylinder groups, the driver's wish for increased moment calculation is carried.

Alternatively, also the power of the cylinder group 2 can be maintained in step 3.7, and the power of the cylinder group 1 can be increased successively on the value of the power of cylinder group 2. With this alternative, there is the advantage of a faster reaction to the driver's wish for increased moment.

FIGS. 4.1 and 4.2 illustrate the development of the opening angle from 2, the throttle flap 6s and 10 from FIG. 1 corresponding to power correcting elements in correlation with the activation state of the gas-changing valve of the cylinders to be deactivated upon transition from full engine operation to partial engine operation.

In FIG. 4.1, the time period on the left corresponds from t0 of the full engine operation (VMB), in which both throttle flaps 6, 10 have an opening angle alpha_0. The time period right from t1 corresponds with the partial motor operation (TMB). The throttle flap 10 is opened at a greater angle alpha_10 in contrast to the angle alpha_0; the throttle flap 6 is opened or completely closed at a smaller angle alpha_6. Between the time points t0 and t1, the transition from full engine operation into partial engine operation is completed, as far as the throttle flap positions are related, with the previously described closing of the throttle flap 6 and the opposite opening of the throttle flap 10. The closing of throttle flap 6 corresponds in this embodiment to the reduction of the power of the cylinder group 1 from step 3.3 of the previously-described flow diagram, and the enlarging of the throttle flap angle alpha (10) corresponds to the increase of the power, or the moment of rotation, of cylinder group 2, likewise in step 3.3 of the flow diagram. FIG. 4.2 illustrates the activation state of the gas-changing valve of the cylinders to be deactivated in temporal correlation to the running of the throttle flap opening angle according to FIG. 4.1.

At time point t0, the transition from full engine operation into partial engine operation with a control command is released. Correspondingly, the throttle flaps angles change in FIG. 4.1 Based on the sluggishness of the gas-changing vale displacement or based on a programmed lag time, the gas-changing valves are deactivated the same by occurrence of the control command, that is, displaced from activation state 1 into activation state 0. Rather, this occurs first at a later time point t1, specifically, when the previous reduction or increase of the power of the different cylinder groups is terminated. The embodiment described here relates to a device with two throttle flaps or valves and a gas-changing function, that can be switched binary over between the state 1, corresponding to an activation of the gas-changing valve, and state 0, corresponding to a deactivation of the gas-changing valve.

When, in contrast, in another embodiment, the maximal valve stroke x can be varied constantly between the value 0 corresponding to a deactivation and a maximal value, other realization possibilities are offered by the present invention. Then, for example, with an internal combustion engine with two cylinder groups, of which one is deactivatable and with only one common throttle flap or valve for both cylinder groups, the power, or moment of rotation of the deactivatable cylinder is returned constantly via a constant reduction of the valve stroke, and simultaneously, the throttle flap for all cylinders can be opened oppositely so that the entire moment of rotation provided by the combustion engine is not changed upon transition from full engine operation into the partial engine operation.

Likewise, the invention can be realized with a completely variable valve control, in which also the filling control of all cylinders is realized via the formation of the valve lift curve. In this case, the valve lift curves of the cylinders to be deactivated are reduced successively in height until they reach the value 0. Oppositely, the valve lift curve of the remaining cylinders is increased such that again the entire moment of rotation provided by the engine is not changed upon transition from full engine operation into partial engine operation. This is shown in FIG. 5. The two curves designated with VMB correspond to the valve lift curves of the gas-changing valves of all cylinders in full engine operation. In this case, the valve lift curves are the same. In partial engine operation, the valve lift curve of a group of cylinders return to the value 0 and the valve lift curve of the other group of cylinders is increased parallel. In the illustrated example, this corresponds to the valve lift curves designated as TMB.

It will be understood that each of the elements described above, or two or more together, may also find a useful application in other types of constructions differing from the types described above.

While the invention has been illustrated and described herein as a method for changing between full engine operation and partial engine operation, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:

1. Method for changing between full engine operation and partial engine operation of a multi-cylinder internal combustion engine, wherein at least an intake valve or an escape valve of a cylinder or a group of cylinders in full engine operation is activated and in partial engine operation is deactivated, comprising the following steps:

throttling power of the cylinder to be deactivated and simultaneously increasing power of other cylinders such that a total moment provided from the engine follows a provided ideal engine moment;

switching off the throttled cylinder via an actuatable intake or escape valve.

2. Method as defined in claim 1, wherein for changing from partial engine operation to full engine operation, in a first step, a switching-on of the throttle cylinder takes place by means of the actuatable intake or escape valve; and in a second step, an unthrottling of the power of the cylinder to be reactivated and a reduction of the power of the other cylinders takes place simultaneously so that the total moment provided by the engine follows a predetermined ideal engine moment.

3. Method as defined in claim 1 with an internal combustion engine in which the cylinder or cylinders to be switched off include a common first throttle device and cylinders to be further operated include a common second throttle device, wherein a throttling of power of the cylinder to be deactivated takes place by means of a closing of the first throttle device and an increase of power of the cylinders to be further operated takes place by means of an opening of the second throttle device of the cylinders to be further operated.

4. Method as defined in claim 1 with an internal combustion engine, in which the cylinder or cylinders to be switched off have a common first throttle device and the cylinders to be further operated have a common second throttle device, wherein an unthrottling of the cylinder to be reactivated takes place by means of an opening of the first throttle device and a reduction of power of the remaining cylinders takes place by means of a reduced opening of the second throttle device of the remaining cylinders.

5. Method as defined in claim 1 with an engine with adjustable stroke of an intake valve, wherein a throttling of power of the cylinder to be deactivated takes place by means of a reduction of the stroke of the intake valve to be deactivated and an increase of power of the cylinders to be further operated takes place by means of an increase of the stroke of the intake valve of the cylinders to be further operated.

6. Method as defined in claim 1 with an engine with adjustable stroke of the intake valve, wherein an unthrottling of the cylinder to be reactivated takes place by means of an increased of the stroke of the intake valve to be reactivated and a reduction of power of the remaining cylinders takes place by means of a reduction of the stroke of the intake valve of the remaining cylinders.

7. Device for changing between full engine operation and partial engine operation of a multi-cylinder internal combustion engine, comprising means for activating at least an intake valve or an escape valve of a cylinder or a group of cylinders in full engine operation and for deactivating the same in partial engine operation; means for deactivating throttling power of the cylinder and simultaneously increasing power of other cylinders such that a total moment provided from the engine follows a provided ideal engine moment; and means for switching off the throttled cylinder via an actuatable intake or escape valve.

\* \* \* \* \*